Nov. 4, 1947.  J. J. ALLINSON  2,429,980
PROCESS OF CONDUCTING CHEMICAL REACTIONS
Original Filed Nov. 27, 1942  2 Sheets-Sheet 2
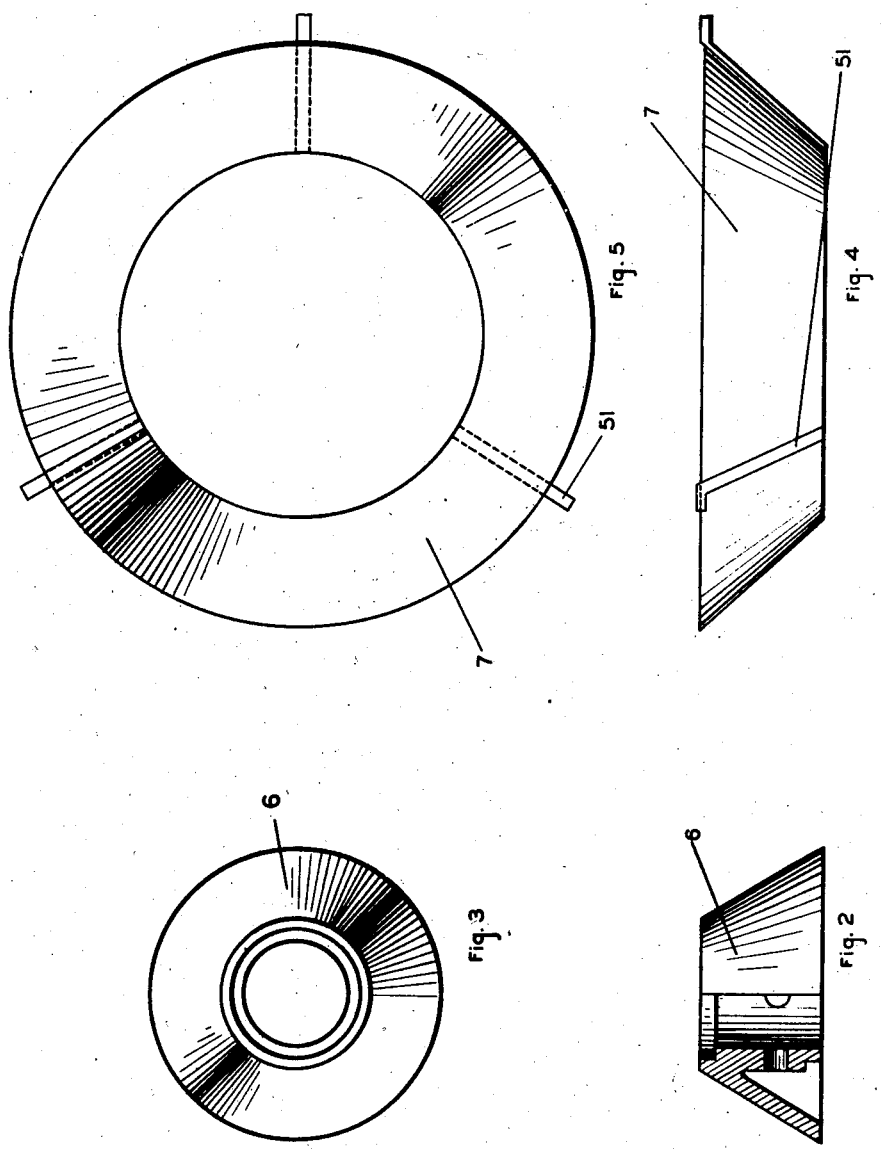

Patented Nov. 4, 1947

2,429,980

UNITED STATES PATENT OFFICE 2,429,980

PROCESS OF CONDUCTING CHEMICAL REACTIONS

John J. Allinson, El Dorado, Ark., assignor to Lion Oil Company, a corporation of Delaware Original application November 27, 1942, Serial No. 467,108. Divided and this application May 6, 1944, Serial No. 534,439

12 Claims. (Cl. 196—52)

This invention pertains to an apparatus and process of conducting chemical reactions. It relates in particular to the type of reactions which can be promoted in the vapor phase, especially catalytic reactions.

One of the objects of this invention is to provide means whereby gaseous fluids and vapors can be caused to react catalytically employing a loosely packed catalyst mass of predetermined thickness with means for controlling the temperature of fluid supplied to and removed from the catalyst bed.

Another object is to provide ready means for heating or cooling a reacting fluid intermediate its travel through a catalyst mass.

Another object is to introduce one of a plurality of reactants into a fluid stream in which reaction occurs, in stages in the passage of the stream through the mass of catalyst, meanwhile controlling the temperature of the stream.

Other objects are evidenced by the disclosures of this specification.

The invention comprises passing a reactant fluid as a stream substantially horizontally through a confined, supported column of loosely packed particles or pieces of catalyst material, the catalyst mass being of predetermined thickness and adapted to downward movement under control, and then immediately contacting the fluid with a temperature controlled surface. The process reactions include oxidation, reduction, hydration, dehydration, absorption, chlorination, cracking, polymerization, depolymerization, and certain other vapor phase reactions. The process also includes the treatment of solids such as the drying of granular materials, sand, catalytic materials and the like.

One form of apparatus for practicing my invention is shown in elevation in Figure 1, a portion of the outer casing being cut away to show the interior in section.

Figure 2 depicts one form of inner baffle unit; half of the unit is shown in section and half of it in elevation.

Figure 3 is a top view of the baffle shown in Figure 2.

Figure 4 shows in elevation one of the outer baffles of the outer series of baffles with one means of support.

Figure 5 is a top view of the outer baffle shown in Figure 4.

Figure 1:
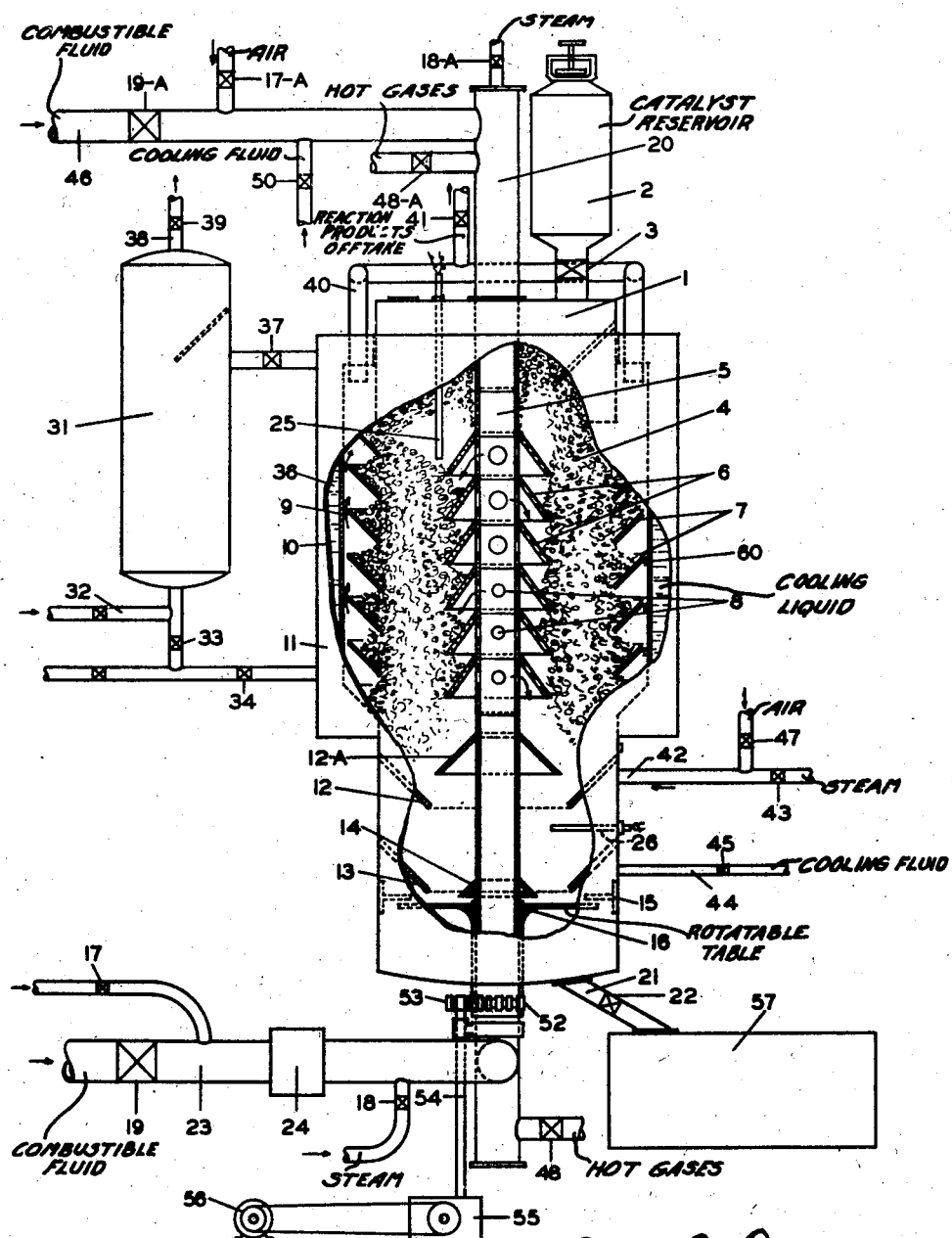

The same system of lettering is used throughout the figures. However, in Figures 4 and 5, the number 51, not shown in the other figures, designates one means of supporting the outer baffles; the member 51 hooking onto lugs 60 provided for the purpose adjacent wall 9 of Figure 1. In Figure 1, the catalyst confining chamber 1 is supplied with catalyst from reservoir 2 through valve 3; catalyst is shown at 4. The tubular member 20 located in the middle of the catalyst bed extending from top to bottom has ports 8 favorably located for the passage of a fluid into the catalyst mass, and a series of baffle plates 6 substantially conical and so favorably located with respect to a second series of baffles 7 as to co-act with them in confining the catalyst in the reaction zone substantially as an annular column; said baffles 7 are each shaped much like the frustum of a cone. Fluids for contacting the catalyst mass are passed into tube 20 from below either through valves 17, 18, and 19 and 48 or from above through valves 17—A, 18—A and 19—A, 48—A and 50, and in either case they enter the catalyst mass through ports 8 and from beneath baffles 6, traversing the catalyst mass in substantially a horizontal path and substantially radially outwardly, passing into the space adjacent the outer baffles and into contact with the temperature controlled wall 9 which co-acts with wall 10 in confining a temperature-control fluid 36; the whole outer jacket is designated 11. Special baffles 12, 12—A, 13 and 14 support the catalyst mass to a large extent maintaining it in a free-flowing condition whereby arms such as those shown at 15 scrape it off of the rotating table 16 at a rate varying under control with the speed of rotation of said table and with the length of said arms. Means of discharging the catalyst or other contact material into receiver 57 is shown at 21 with control valve 22. Fluids entering reaction chamber 1 from below through 17 and 19 are caused to mix in mixing chamber 24; this chamber is not shown above but can readily be provided when its use is indicated. Valve 50 controls a supply of cooling fluid which may be water mist or other medium. Means for rotating table 16 are indicated by gears 52 and 53, shaft 54, connected with speed-control gear-box 55 which is belt connected to motor 56 which is connected to a suitable source of power. Fluid 36 circulates through jacket 11, which jacket becomes a boiler when high temperature reactions are promoted in the mass of solids, under which condition the heat of reaction is utilized and proper boiler connections are made as diagrammatically indicated by tank 31 having inlet 32 for cooling fluid which is supplied to the jacket through valves 33 and 34. Effluent fluids from jacket 11 pass out through valve 37 into tank 31 and discharge thence through 38 and valve 39. An offtake 40 for reaction products has control valve 41; and an auxiliary supply line for steam and/or air 42 has control valve for steam and air respectively at 43 and 47; line 44 has control valve 45 for regulating the supply of a cooling fluid which may be steam, water mist or other medium. Thermocouple wells 25 and 26 are provided for thermocouples used in recording temperature of the mass 4; no connections are shown because standard practice is employed. Baffle 12—A is complementary to baffle 12 and is used along with 12 when the catalyst mass is very dense and heavy; when used alone it has the effect of allowing the catalyst adjacent the outer baffles 7 to flow downwardly at a faster rate than it flows adjacent the inner series of baffles 6, contrariwise, when 12—A is omitted and 12 is used alone the catalyst adjacent the inner series of baffles 6 flows downwardly at the faster rate, provided in each case the baffles 12 and 12—A extend far enough into the mass of catalyst and their angles of slope downwardly are not too steep. Although any chosen fluid may be admitted to 20 and into mass 4, for the purpose of clearly describing my invention the major valves, and the fluids they control, are respectively as follows: 17, 47 and 17—A are for air; 19 and 19—A, combustible aeriform fluid; 18, 18—A and 43 are for steam, superheated or saturated; 48 and 48—A are for hot gases; and 45 is for any suitable aeriform cooling fluid and may be air or steam.

Before describing detailed operation of the process with specific reference to a particular chemical reaction, I prefer to call attention to a number of reactions which can effectively be carried out in the described apparatus, with brief general reference to procedure.

The drying of granular solids or solids in a state of small division is a simple application of the invention; the solids may be coal, carbon, a catalyst, or other material typified here, for example, as sand, as follows:

*Example I.—Referring to Figure 1*

Introduce the moist sand into chamber 2 through the top charging door leaving valve 3 open. The sand will soon fill chamber 1 substantially as shown in Figure 1. Hot gases are now passed through 48—A and 20 into the mass of sand 4 through ports 8, thereby warming the sand, vaporizing water therefrom into the gas stream which stream is removed adjacent baffles 7 as shown by the arrows and passed through outlet 40 and valve 41. Table 16 is rotated and a rate of rotation is adjusted to co-act with the rate of supply of hot gas whereby the sand is dried but not discharged too hot through 21 and 22. If the sand is too hot the rate of rotation of table 16 is increased by adjusting speed control gears in box 55, or the rate of supply of hot gas is decreased by throttling valve 48—A, or cooler gas is supplied through 48—A, or combinations of these procedures are practiced; the temperature of the gases passing through 40 should not be below the dew point of water. Reservoir 2 is kept reasonably full of sand throughout the operation. In this example it is not necessary to circulate cooling fluid through jacket 11. When it is desirable to discharge the sand hot the hot gases supplied to 1 should be admitted through 48 instead of through valve 48—A. This general procedure is applicable to the revivification of catalysts, gas treatment of catalysts, drying of ore from mineral washing tables, drying coal and other crushed products. The fluid used of course is varied to suit the material treated and object sought. In the simple treatment of sand one can use combustible gas and air, burning the gas, in effect, in contact with the sand, or another heating fluid may be used, whereas with crushed coal, prepared for coking, air usually should not be used alone, rather superheated steam, with or without combustion products, is preferred, thus avoiding oxidation of the coal, preserving its coking qualities. Incidently coal treated in this manner is coked in a carbonizer in half the time normally required. The most economical effect is obtained with good coking coal by burning premixed gas and air in or substantially along with steam and passing the mixture of the three through the coal bed at a temperature below its plastic temperature. This is accomplished by controlling valves 17, 19, and 18, the upper reactant-fluid valves being closed, and discharge valve 41 open. With minerals comprising sulphides it is usually preferred to burn a gas in contact with the crushed mineral matter using excess air thereby promoting the combustion of said sulphides to oxides, sulphur dioxide also being formed. The treatment of catalysts commonly requires that a definite atmosphere be used such as hydrogen, air, etc. With refractory materials, commonly it is required that carbon be burned off of their surfaces, in which case air alone is supplied as through valve 17 or hot gas through 48 and air through 17.

Controlled combustion and partial or incomplete combustion reactions in which the solid mass is itself a reactant, may include the carbonization of wood with the production of char, carbonization of lignite, sub-bituminous coal and other materials which are carbonizable and which will flow at elevated temperatures, and they are typified in a general way, referring to Figure 1 as follows:

*Example II.—Carbonization of sub-bituminous coal*

As in Example I, chamber 1 is filled with crushed and rather uniformly sized pieces of the coal. A hot fluid, for example superheated steam is introduced into 20 by opening valve 18—A, causing hot steam to pass through the mass 4 of coal. In this case table 16 is not rotated until the temperature of the gases and water vapor leaving the reaction chamber 1 through 40 is above 100° C. This treatment is continued and after the carbonaceous mass is fairly well heated table 16 is rotated at a rate adapted to obtain the desired degree of carbonization of the coal. A slow rate of rotation yields an over-carbonized char whereas a high rate yields an under-carbonized char; an analysis of the char will show the degree of carbonization. After the operation is under way hot gaseous products of combustion can be substituted at least in part for the superheated steam by opening valve 48—A, with or without some air which may be introduced through 17—A. When the recovery of particular by-products of distillation in the offtake vapors is desired the amount of air used is carefully controlled or eliminated. However, the use of air, as through 17—A with or without added combustible gas through 19—A, promoting combustion within said mass, decreases carbonizing time and decreases the amount of steam used per ton of solid combustible carbonized. When air is used as described, the temperature in the mass of fuel in process is highest at the level of the lower baffles of series 6 and 7, and cooling is desired at a point close to these baffles; under these conditions cooling fluid, steam or water mist is admitted through 45 and 44 beneath the special baffle 13. The temperature of the fluid in jacket 11 is kept sufficiently high in this example to prevent appreciable condensation and settling out of distillation products against surface 9 of said jacket; this is accomplished by limiting the amount of circulation of said fluid 36 and by the selection of said fluid. Water can be used in general, and temperatures above 100° C. attained when the water is confined under pressure. With high temperature gases the jacket affords a means of superheating the process steam. Other high-boiling liquids may be used in place of water as fluid 36.

*Example III.—Distillation of sawdust*

When sawdust is distilled substantially as outlined in Example II, using superheated steam, turpentine spirits and other products of distillation are obtained. It is found that after the distillation is fairly well started there is a strong exothermic reaction which alone is sufficient to carbonize the sawdust. Accordingly very little steam is required for the late stage of carbonization, except for flushing purposes, and the rate of travel downward chiefly depends on the rate of initiating the exothermic reactions; in other words, it is more essential that the superheated steam pass through the bed of sawdust adjacent the upper co-acting baffles 6 and 7 of Figure 1 than through the mass at lower levels. This may be accomplished in two ways, or a combination of both, namely the number and size of the ports 8 adjacent the lower co-acting baffles can be and are smaller than the upper level ports; fewer ports may be employed or they can be limited at the lower levels. I prefer to use small ports at the latter levels rather than none or the use of blocked-off sections containing the lower ports. The sawdust can be completely carbonized or incompletely carbonized according to the heat energy applied to it as steam, as combustion gases, as air for combustion, and according to the rate of flow of sawdust as determined by the speed of rotation of table 16 and according to the amount of cooling fluids admitted to the lower portion of the reaction chamber through 42 and 44.

*Example IV.—Revivification of a solid catalyst*

Referring to Figure 1 and considering the catalyst to be black copper oxide which exists in more or less granular condition and which is partly reduced, the catalyst is charged into chamber 1 from reservoir 2 until it is filled substantially as shown in the figure. Warm air is introduced through 17—A and 20, passed through ports 8, through the catalyst mass 4, out adjacent the outer baffles 7, through offtake 40 and valve 41. The oxidation of the reduced copper occurs at relatively low temperatures, the reaction is represented by Equation 1 as follows:

(1) 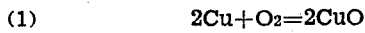 $2Cu + O_2 = 2CuO$

The reaction is exothermic and heat is generated to the extent of 34.9 kg. calories per gram formula weight or per 79.57 gms. of CuO equivalent to 986 B. t. u. per pound of copper oxidized. Because of the heat of reaction it is only necessary to initiate oxidation by using warmed air after which air at about room temperatures can be used; the tumbling action and mixing of the particles of catalyst are helpful in avoiding overheating and in producing a uniformly revivified catalyst. Table 16 is rotated, after oxidation is started, at a rate which removes the catalyst substantially as fast as it is revivified, which is determined by test. Oxidizing 1000 lbs. of copper to copper oxide (CuO) requires theoretically 14,170 cubic feet of air; actually the amount of air required is somewhat more than this even when the initial temperature of the air at the start of processing is 150° to 200° C.

It will be noted that copper oxide functions as an active catalyst to oxidation and certain other types of reactions at temperatures of the order 120° to 310° C. and in some cases at temperatures even higher than 310° C. The apparatus shown in Figure 1 can be used to carry out the catalytic reactions themselves by introducing the reactant fluid through suitable connections to conduit 46, through 19—A, 20, and on through the catalyst mass 4; the oxygen or air for the reaction and for the maintenance of the catalyst in active condition is introduced along with the material to be oxidized, as by opening valve 17—A, avoiding an appreciable excess of air over requirements. The reaction products in this case leave the catalyst mass in the usual manner as described, at substantially the temperature of the catalyst mass, the heat of reaction being utilized to heat fluid in jacket 11, which latter, in cooling the stream of reaction products immediately after their formation, prevents side reactions and extraneous reactions from occurring in the fluid stream after leaving the catalyst mass. Operating my invention in this manner table 16 is normally rotated only sufficient to maintain the catalyst mass loose and clean and to make room for replacement catalyst. Cooling fluid, when required, is introduced simultaneously with the reactant fluid through 50, which fluid may be atomized water, steam, or other material when 50 is suitably connected with such a source of supply. Table 16 may be rotated at such a speed that fresh, cool catalyst is rapidly supplied to chamber 1. Periodically the catalyst may be steamed and air treated in situ without the presence of other reactants.

Examples of oxidation reactions which may be conducted in this manner with a solid oxidation catalyst, such as copper oxide, vanadium pentoxide, silver, silver oxide, gold, platinum, palladium, and others, are the following:

(A) Oxidation of naphthalene to phthalic anhydride; vanadium pentoxide being a good catalyst. This highly exothermic reaction must be conducted in such a manner that the reactants and reaction products are not overheated, in order to prevent the formation of considerable tarry matter. The reaction is indicated by Equation 2.

(2) 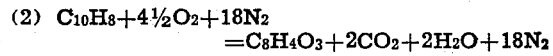 $C_{10}H_8 + 4\tfrac{1}{2}O_2 + 18N_2$
$= C_8H_4O_3 + 2CO_2 + 2H_2O + 18N_2$ The heat of reaction is 6310 B. t. u. per pound of solid naphthalene converted according to Equation 2. A satisfactory operating temperature for promoting the reaction of Equation 2 is about 400° C. The reaction products, after condensing and removing the organic components comprise, on the dry gas basis, chiefly nitrogen and carbon dioxide, which are satisfactory diluents for recirculation with the naphthalene as a temperature controlling medium. By periodically interrupting the flow of reactants into the catalyst bed and treating the catalyst to revivifying and temperature control fluids, the operation becomes cyclic, and temperature more exact without the use of an excess of diluent fluids. The naphthalene vapor is introduced through 46 and 19—A and the air through 17—A, steam may be introduced through 18—A and recirculated gases through 48—A, and the stream of reaction products pass out through 40 and 41.

(B) Formaldehyde is another product of incomplete oxidation and is made practicing my invention substantially in accordnce with Equation 3

(3) $CH_4 + O_2 = HCHO + H_2O$

Quick cooling of the reaction products is a very important factor in preserving maximum yield and recovery of the formaldehyde, because its rate of decomposition is high at temperatures favoring its formation. The heat liberated is approximately 360 B. t. u. per cubic foot of methane thus burned. In promoting this reaction it is difficult to prevent some complete oxidation of the methane; in order to minimize this effect the air and methane, or air and natural gas used, are carefully and completely mixed before they are introduced into the catalyst mass. The velocity of flow through the catalyst mass is maintained at a high rate consistent with the speed of reaction, and, referring to Figure 1, the cooling wall 9 is preferably kept at a temperature below about 150° C. The gaseous products of combustion besides formaldehyde are chiefly nitrogen and water vapor with some methane and carbon dioxide, and I find that when these combustion products are freed from the formaldehyde and water they are well suited for dilution of the initial air-gas mixture as well as for the purpose of aiding temperature control in the catalyst mass. Again referring to Figure 1, a matter of prime importance in obtaining the most efficient results is to so control the thickness of the catalyst mass between the inner series of baffles 6 and the outer series 7 that the reaction products are not caused to linger too long in contact with the heated catalyst. In this manner more of the heat of reaction is carried out of the catalyst mass as sensible heat of the reaction products. The result is accomplished by properly proportioning the mean diameters of the two series of baffles and to some extent regulating linear velocity of flow of reactants through the catalyst bed.

(C) The production of aldehydes by dehydrogenation of monohydric alcohols also comes within the confines of my invention, the reaction being typified by Equation 4.

(4) $CH_3OH = HCHO + H_2$

This reaction typifies dehydrogenation reactions which can advantageously be promoted in the apparatus shown in Figure 1; it is not an exothermic reaction. Heat must be supplied in this example to the extent of about 100 B. t. u. per cubic foot of alcohol vapor converted. An alloy metal catalyst, as silver, copper, platinum, nickel, and certain combinations including silver with small amounts of platinum, manganese oxide, and some partially reduced metal oxides, is catalytic to this process, which may be conducted at atmospheric pressure and at temperatures within the range 200° to 350° C. Because of the tendency of the alcohols to form olefins and water when heated in this temperature range, the use of some superheated steam in the reactant fluid stream is helpful with the heated alcohol vapor; this substantially eliminates the dehydration reaction. It is possible to cause two reactions to occur simultaneously in producing formaldehyde from methanol, namely the one shown above as Equation 4 and the oxidation reaction shown in Equation 5, which is exothermic.

(5) $CH_3OH + O_2 = H.CHO + 2H_2O$

My experiments show that in the catalyzed conversion of methanol to formaldehyde it is an economy to use air and some steam in admixture with the methanol preparatory to catalytic conversion. The mixture is passed through the catalyst mass in the manner described, the catalyst is removed by rotation of table 16, Figure 1, sufficiently to keep the catalyst bed loose and clean; the operation is conducted at substantially atmospheric pressure and heat generated is recovered by absorption in the fluid in jacket 11.

Special means for initiating combustion have not been shown in the figures because means known in engineering practice will be followed. However, in order to make disclosure complete either of several procedures may be followed, namely, (a) blast hot gases through valve 48—A until the temperature of the mass of solids 4 adjacent baffles 6 of Figure 1 is above the ignition temperature of the combustible fluid to be burned and then admit said fluid through 19—A, the air for combustion through 17—A, or (b) when filling the reaction chamber with solids introduce enough ignited charcoal to fill the annular space between the series of baffles 6 and 7, the rest of the charge being the chosen preferred contact material; as the mass is blasted with air through 17—A the charcoal is consumed and the contact material gradually takes its place and becomes heated, the thermocouple being a guide as to the temperature when connected with a pyrometer potentiometer, or (c) duct 20 can be filled from the top flange with ignited charcoal and air blasting of it will bring the temperature of the solids 4 up to the starting temperature.

(D) Absorption of condensable components of gaseous or vaporous fluids is practiced employing this invention by using as the "catalyst mass" an absorbent or adsorbent, including such materials as active carbon, silica gel, alumina, aluminum oxide gel, clay, other metal oxides, metal silicates and other solids. In this case, referring to Figure 1, table 16 is rotated, slowly, rapidly or intermittently according to the need for removing the adsorbent mass. Not only are lighter hydrocarbons adsorbed from such gases as natural gas, refinery gases and the like, which hydrocarbons include propane, butane, pentane, hexane, some higher molecular weight members of the series, and light unsaturated hydrocarbons, but it is possible by controlling the temperature of the adsorbent to make preferential separations. For example, treating natural gas at ordinary temperatures, 15° C., employing a rather thick bed of carbon as adsorbent, natural gasoline is adsorbed which contains some propane and butanes, whereas at somewhat higher temperatures propane is not adsorbed and very little butane is adsorbed. Preferential adsorption of unsaturated hydrocarbons in refinery hydrocarbon fluids is obtained by controlling the temperatures of the mass of adsorbent, the supply of said fluid, as well as by the choice of the adsorbent used and the periodic treatment of said adsorbent. Clay and alumina, for example, promote polymerization and adsorb certain sulphur compounds, and polymers. These are largely removable by steaming the adsorbent. Moisture and sulphur dioxide are adsorbed by dry carbon, dry silica gel and other solid adsorbents, at atmospheric pressure and temperature; these also are dispelled with hot gases or superheated steam. The principle is useful in drying and cleaning air for theatres and factories; the dried air can be cooled as desired by controlling the temperature of the fluid supplied to cooling jacket 11, Figure 1.

Sulphur dioxide and hydrogen sulphide are adsorbable on silica gel and carbon and they can be caused to react with one another at a rapid rate in contact with either of these materials at rather low temperatures, forming sulphur at a temperature below its melting point; the reaction being exothermic it is necessary to employ dilute mixtures of these gases in a common diluent or provide a cooling medium for absorbing the generated heat, or employ both methods of control. Much of the sulphur is entrained in the gas. The rotation of table 16 of Figure 1 keeps the catalyst-adsorbent in a loose condition so that the sulphur passes on entrained in the gas in a fine state of sub-division. A cooling fluid is circulated through the jacket 11 in this case.

(E) Maleic anhydride is prepared in substantially the same manner as outlined above for phthalic anhydride, it being an oxidation product of benzene, obtained at about 400° C., using vanadium pentoxide catalyst, or other suitable oxidation catalyst, by direct oxidation.

(F) Foul gas may be treated by passing a mixture of it with air through the bed of catalyst which, in this instance, may be fine-size coke, along with sufficient air to maintain the coke at a red heat or hotter, burning any combustible matter in the foul gas; the outlet gas, or treated gas, is then less offensive. Using solid refractory material as catalyst, such as crushed fire brick, the catalyst is heated in place to a red heat by burning a combustible gas with air in contact therewith in the manner outlined above, then the foul gas, plus air, is introduced as a steady mixed stream into the heated catalyst mass with additional combustible gas if and as required to maintain the catalyst at a red heat; the sensible heat of the reacted gas stream is utilized as described. Only infrequent replacement of the catalyst is necessary in this case.

*Example V.—Cracking hydrocarbons and referring to Figure 1*

In the thermal decomposition of hydrocarbons, such as petroleum fractions, the matter of control of temperature, of time of contact of the reactant material with the catalyst, of the duration of time reaction products remain at elevated temperature and of concentration of diluent fluid are all factors of major importance in obtaining optimum results. Butadiene which may be formed under a given set of conditions is largely destroyed by further reaction if it is maintained at high temperatures over any appreciable amount of time. Because this invention is believed to be particularly applicable to reactions conducted under such conditions and because it has particular bearing on cracking and re-forming of hydrocarbons, I prefer to give complete details of operation employing a volatilizable petroleum hydrocarbon as basic raw material in this example. A mixture of superheated steam and the heated vapors of said hydrocarbon is caused to pass through 20 by opening valves adapted to supply these materials such as 18—A and 19—A, after first filling chamber 1 with substantially granular, or coarse-size, refractory contact material such as alumina, copper, solid silicates, silica, metal oxide, or other catalyst adapted to facilitate the cracking of said hydrocarbon. The stream of gas-steam mixture is passed from 20 into the catalyst mass 4 at a velocity sufficient only to provide the chosen time of contact with said mass, usually within the limits 0.1 second to 4 seconds according to the completeness of reaction sought; the velocity is low enough so that the mass of catalyst is not carried away in the gas stream. The gas stream with reaction products is then quickly cooled by contact with surface 9 of jacket 11, and is passed out through offtake 40 for further treatment and removal of products of reaction. Meanwhile, a fluid 36 is circulated through jacket 11 for the double purpose of cooling reaction products and recovering some of the sensible heat of the gas stream. Using superheated steam at 540° C. and heated hydrocarbon in the vapor phase at 600° C. in equal volumes, the mean temperature of the mixture is commonly less than half the sum of the two temperatures, being, in this instance, about 550° C. Although this temperature suffices for certain cracking reactions, it is lower than optimum temperature for making many desired end products such as unsaturates, including those with more than one double bond; butadiene and isoprene are obtained in optimum amounts at higher temperatures, namely 750° C. to about 850° C., and the time of exposure of hydrocarbon vapors to these temperatures should be very short. Instead of increasing the amount of steam or the degree of superheat thereof, it is frequently advantageous and simple of control to burn a hydrocarbon in air or in another oxidant in close proximity to or in the reaction chamber so that the hot combustion products, without excess of air, are introduced into the gas-steam mixture in amounts sufficient to raise the temperature of the whole to 600° to about 900° C. or somewhat higher. Since a short time of exposure to contact with solids at this temperature is desired, the number of baffles in series 6 and 7 is less than for longer contact periods, and the relative sizes of the baffles 6 and 7 are such that a relatively thin mass of solids only is maintained between them. The mass of catalyst supported between 6 and 7 may have a mean thickness of 6 inches or less, or more than 2 feet, according to the contact desired; a thickness of 18 to 20 inches is quite satisfactory for many cracking reactions. Table 16 is rotated very slowly or intermittently, sufficient to keep clean active hot catalyst in the region of baffles 6 and 7. When cracking or reforming reactants at 700° C. or more, some carbon forms when certain high-boiling hydrocarbons are used as raw material, and this carbon adheres to the catalyst mass 4. In order to avoid more complete cracking it is usually desired that the catalyst be as free from carbon as possible; therefore, the regular removal and replacement of catalyst 4 is essential under these conditions. During this downward travel of said catalyst steam is admitted to chamber 1 through 42 and 43; this not only cools the outgoing catalyst but it also cleans and refreshens it, reacting with carbon, and carries heat back into the reaction zone. Thus, when using a contact catalyst such as crushed firebricks, with or without a metal or metal compound thereon, the particles are commonly in suitable condition to be returned to charging hopper 2 after discharging from the bottom of 1. When the temperature of the catalyst is somewhat too low for cleaning as described, air is also admitted to chamber 1 through 47. In order to eliminate the necessity of moving the catalyst downwardly at too rapid a rate or too often, I find it sometimes is quite helpful to interrupt the operation at determined intervals of time and make a steam-air "run" whereby carbonaceous material is cleaned from the catalyst; this makes the operation cyclic. The extent to which this can be carried out is limited, with metal catalysts, unless the operation is followed by treatment with reducing gases, for reasons which are obvious. Employing metal catalyst in the form of shot it is a simple matter to obtain satisfactory results either by the downward continuous flowing of the catalyst or by interrupted flow of the catalyst accompanied by occasional treatment with an aeriform fluid in situ.

Hydrocarbon reactions which can very effectively and advantageously be carried out substantially as described are represented, in effect, by Equations 6 through 16.

(6) $C_2H_6 \rightarrow C_2H_4 + H_2$
(7) $C_3H_8 \rightarrow C_2H_4 + CH_4$
(8) $C_3H_8 \rightarrow C_3H_6 + H_2$
(9) $C_4H_{10} \rightarrow C_3H_6 + CH_4$
(10) $C_4H_{10} \rightarrow 2CH_4 + H_2$
(11) $C_4H_{10} \rightarrow C_4H_8 + H_2$
(12) $C_4H_{10} \rightarrow H_2C=CH-CH=CH_2 + 2H_2$
(13) $C_5H_{12} \rightarrow CH_4 + CH_3 \cdot CH_2 \cdot CH:CH_2$
(14) $C_5H_{12} \rightarrow CH_4 + (CH_3)_2C:CH_2$
(15) $C_5H_{12} \rightarrow C_2H_6 + CH_3 \cdot CH:CH_2$
(16) $C_5H_{12} \rightarrow C_2H_4 + C_3H_6 + H_2$ Naphtha and gas oils are similarly crackable. Results indicated by Equations 7, 8, 9 and 10 occur within the temperature range of 450° to 650° C. substantially without deposition of carbon. Copper or nickel catalyze the reactions but copper is preferred. Aromatic compounds are produced as the cracking temperature is increased above 700° C., in increasing amounts. Copper let down on or supported on crushed refractory material such as alumina or firebrick is an excellent catalyst for these reactions; copper shot can be used in a definite temperature range.

Although it is well known that hydrocarbons, heated sufficiently high, will crack, forming products of lower molecular weight, and ultimately forming hydrogen and carbon, so far as I am aware, it has not been shown that when a stream of a hot hydrocarbon vapor mixed with superheated steam and air or other combustion supporting fluid is passed to a bed of hot catalyst at a velocity greater than the speed of flame propagation through the mixture, and then passed through a layer of catalyst at a low enough velocity for combustion of a portion of the combustible matter of the mixture to occur within or adjacent the catalyst, releasing sufficient heat to maintain the catalyst at a temperature favorable for the reactions to occur, optimum cracking and reforming results can be obtained and the products thus made can be preserved from further decomposition or pyrolysis by quickly and immediately cooling them through contact with a cooled surface, in equipment substantially as shown in the figures.

Even carbon black of good quality can be obtained in this manner when the contact time is relatively long, in some cases 0.6 to several seconds, the catalyst pieces have an average diameter of about ¼ to ½ inch or more and the maximum temperature in the catalyst mass is higher than about 700° C. Iron and nickel catalyze this reaction. In making carbon in this manner it is quite essential that the pieces of catalyst comprising mass 4 be of fairly uniform size and that the table 16 be rotated rather continuously during the cracking operation so that the maximum amount of the carbon formed is carried out entrained in the fluid stream. The general procedure is substantially as described above but it is quite advantageous to recirculate some of the products of reaction with the hydrocarbon used for carbon production, and for the purpose of this example it will be considered that the air, hydrocarbon and whatever steam is used enter through valves 17—A, 19—A and 18—A respectively and that recirculated gas enters through valve 50. Although methane, ethane and even higher molecular weight hydrocarbons when sufficiently diluted are satisfactory for making carbon black, it is possible to make extra quality carbon black in this manner using unsaturated hydrocarbons such as ethylene and propylene as basic raw material.

Because of the importance of the method of making carbon black from carbon monoxide using my invention I desire to show by example specifically how this is accomplished, as follows:

*Example VI.*—Referring to Figure 1, employing as a reactant, carbon monoxide, and making carbon by the catalyzed reaction shown in Equation 17:

(17) $2CO = CO_2 + C$

The heat generated in this reaction is about 90,000 B. t. u. per 1000 cubic feet of carbon monoxide. A mixture of about 20 per cent or somewhat more of carbon monoxide with inert aeriform fluid is ideal for conducting the reaction without giving consideration to dissipation of heat of reaction; the carbon and gaseous products carry away as sensible heat substantially all of the heat generated in this case. The inert fluid preferably is nitrogen, steam, or mixtures, or stack gas which is preferably substantially free from oxygen. Carbon black is formed in this reaction at considerably lower temperatures than those at which carbon combines with carbon dioxide by reverse reaction to form carbon monoxide and lower than those favorable for the water gas reaction to occur. Although a temperature of about 200° to 400° C. is desired to initiate the reaction, it can economically be conducted at higher temperatures, limited by equilibrium relations and reaction velocity. At temperatures above 450° C. the amount of carbon monoxide in equilibrium with carbon and carbon dioxide increases rapidly with increments in temperature. The preferred temperature for initiating this reaction is below about 450° C. and the velocity of the reactant stream containing carbon monoxide through the catalyst mass is sufficiently high so that secondary reactions between steam or carbon dioxide with hot carbon do not occur in appreciable amounts. Iron, or partly carbidized iron, or chromium, is a suitable catalyst for the reaction. The iron, as borings or other form, is charged in the hopper 2 and chamber 1 until they are filled. Then the iron in the reaction zone is heated to about 450° C. by admitting burning gases into the iron mass; the combustible gas entering 20 through valve 19 is carbon monoxide reactant gas but could be any combustible gas, and the air for its combustion is admitted through valve 17. After the iron adjacent the inner baffles 6 is heated the air valve 17 is closed but the stream of monoxide-laden gas is continued, the products of reaction passing out of the iron mass as indicated by the arrows adjacent the cooling surface 9 and then through offtake 40 and 41 to suitable carbon removing equipment such as a Cottrell precipitator, which is not a part of this invention. The heat of reaction carried out of the iron bed as sensible heat of the gas stream is largely imparted to surface 9 against which cooling fluid 36 is maintained. The velocity of the gas stream is high enough to prevent deposition of entrained carbon on surface 9.

The iron catalyst seems to retain some carbon in combination and therefore it is desirable to introduce super-heated steam either alone or with air, or even air alone, after an appreciable period of operation, to clean the catalyst by operating valves 17 and 18, and 19; any portion of it which is oxidized by this step will readily be reduced when the cleaning step is discontinued and the monoxide gas stream is again started. Table 16 is preferably slowly rotated during the course of production of the carbon black. Air used for cleaning may be introduced through 47 and 42 during regular operation if desired but it does not clean the catalyst in the upper reaction zone. The discharged catalyst is used again or discarded according to its condition, value, and number of days used. Crushed iron ore, the oxides, carbonate, or hydroxy oxides, upon partial reduction, are satisfactory catalysts, hence the spent catalyst can economically be discarded and used as feed stock for a blast furnace, thus eliminating the necessity of cleaning iron carbide catalyst.

The properties of the carbons made as described vary according to duration of time that the reactant stream is in contact with the catalyst mass, temperature attained in said mass by said stream, initial concentration of the monoxide in the reactant stream, diluent employed with the reactant, initial moisture content of the reactant stream, and other variables besides the nature and size of catalyst particles and rate of catalyst mass downwardly through the reaction chamber.

One excellent grade of carbon is made using crushed dense iron ore catalyst, pieces about ½ inch average diameter, with maximum temperature of catalyst bed about 450° C. and mean thickness of bed in reaction zone about 18 inches.

Other reactions that are advantageously conducted in the apparatus shown in Figure 1 are:

(A) Purification of gases containing hydrogen sulphide, employing iron oxide as catalyst whereby the sulphide of iron forms and sulphur is also formed, revivification taking place by the use of oxygen or air in situ or in another similar apparatus. The bed of iron catalyst is kept loosely packed by virtue of the rotation of table 16. This procedure is applicable to city-gas plants; reactions are promoted at low temperatures, commonly below 110° C.

(B) Olefins are prepared by dehydration of alcohols, as typified by Equation 18:

(18) $C_2H_5OH \rightarrow C_2H_4 + H_2O$ (favored by reduced pressure)

using an active alumina catalyst at temperatures approximating 320° C., at atmospheric pressure; the heated vapors of alcohol are simply passed through the catalyst bed. Other dehydration reactions can equally well be carried out in the same manner and a large portion of the sensible heat of the products recovered; inert dilution of reactant is favorable.

(C) Gases and vapors containing organic sulphur compounds can be treated with steam and a catalyst and the organic sulphur compounds converted to hydrogen sulphide at elevated temperatures, or the preferential combustion of the sulphur compounds to sulphur dioxide can be accomplished by controlling the amount of oxidant used and the temperature of the catalyst mass. With proper adjustment of air and gas the sulphur compounds are converted to hydrogen sulphide and sulphur dioxide which react further to form sulphur at lower temperatures, recoverable as such. Thus when a gas stream containing an appreciable amount of hydrogen sulphide is mixed with a predetermined amount of an oxygen-laden gas and passed through a bed of refractory material in the manner already described, liquid sulphur can be condensed from the effluent gas or sulphur dioxide produced according to Equations 19 and 20.

(19) $\quad 2H_2S + O_2 = 2H_2O + S_2$

(20) $\quad 2H_2S + 3O_2 = 2H_2O + 2SO_2$

For mixtures of carbon dioxide and hydrogen sulphide along with small amounts of a hydrocarbon it is beneficial to rotate table 16 during operation but it is not necessary to rotate it continuously except where temperatures are high due to large amounts of hydrogen in the gas treated. Recirculation of recovered carbon dioxide with the gas to be treated will keep the temperature of the refractory bed within due bounds, namely below about 1050° C. and above about 400° C.

(D) Reforming of hydrocarbon compounds by the cyclic steps, heating a bed of refractory solids which may be catalyst, to incandescence by burning hydrocarbon vapors or gas with air in direct contact with said solids, by opening valves 19 and 17, for a period, taking the products of combustion off through 40, then discontinuing the heating operation and passing hydrocarbon and steam, preferably superheated steam, through said bed by opening valves 19—A and 18—A, removing the stream of reactants through 40 but keeping them separate from the said products of combustion; some air or oxygen is introduced as occasion warrants for the purpose of increasing the relative duration of the "make" period and also for providing nitrogen in the finished product when the re-formed gas is used for making ammonia or other nitrogen compound. The reactions are typified in Equations 21 to 24 inclusive.

(21)
 Heating reaction $CH_4 + 2O_2 = CO_2 + 2H_2O$

(22)
 Gas making reaction $CH_4 + H_2O = CO + 3H_2$

(23)
 Gas making reaction $CH_4 + 2H_2O = CO_2 + 4H_2$

(24)
 Gas making reaction
 $4CH_4 + 3H_2O + O_2 + 4N_2 = 3CO + CO_2 + 11H_2 + 4N_2$ For generating hydrogen for ammonia production I find that any of the gaseous or vaporizable hydrocarbons, particularly paraffinic hydrocarbons, can be reformed in this manner and that it is possible to adjust the nitrogen content of the reformed product so that the $H_2$ to $N_2$ ratio will be 3 to 1, more than 3 to 1, or less than 3 to 1, as desired, by adjusting the amount of air used with the steam hydrocarbon mixture; increasing the proportion of air decreases this ratio and vice versa. Natural gas, natural gasolines or fractions thereof are satisfactory raw materials for these reactions. In this example table 16 is rotated sufficiently to keep the bed of solid refractory material 4 from channeling; the steam and air keep it free from any carbon accumulation should any form. The actual amount of steam used is greater than indicated by the equations; an excess is usually required for most satisfactory results, and a moderately thick bed of refractory is employed for the purpose. This procedure is described at some length because it has particular bearing on what is believed to be an important use for this process in the petroleum industry. Attention is called to the result obtained by a slight modification of conditions for producing the CO and $H_2$ mixtures, as follows:

Example VII.—Cracking—reforming hydrocarbons

When petroleum naphtha, butane, natural gasoline, mixtures of them or fractions of them having a molecular weight greater than 16 is vaporized, heated to 550° C. or somewhat higher, and this vapor passed in admixture with superheated steam in the proportion 1 mole of hydrocarbon to 0 to 5 moles of steam, and the mixture passed as a stream into the heated contact mass 4 at such a velocity that the total time of contact of the vapors with said mass is within the approximate limits 0.1 to 0.4 second at a temperature of about 850° C. and within the limits 0.2 to 2.0 seconds at 650° to 750° C., very little carbon monoxide is formed, the reactions occurring are chiefly cracking-reactions and the products formed are unsaturated hydrocarbons including butadiene, isoprene, ethylene, propylene, butylene, aromatics including xylene and benzene, and methane and hydrogen. The heat required by these reactions is much less than that for those shown in Equations 22 and 23. By heating the steam used to a temperature of more than 500° to 600° C. very little additional heat is required and this amount can readily be supplied by the use of a relatively small amount of air with the gas-steam mixture. Some of the results cracking commercial butane are as follows:

Steam used—½ mole per mole of charge.
Vapors used—commercial butane.
Maximum temperature of catalyst—750° C.
Time contact—0.8 sec.
Propylene formed, grams per 100 gms. of butane passed—22.0.
Butane cracked—37.0 per cent of the charge.
Ratio, gms. of propylene formed to gms. of ethylene formed—5.0.
Catalyst—copper metal.
Air used during cracking—none.
Higher unsaturates including butadiene—1.3 per cent.
Operation cyclic, alternate heating and cracking periods.

Employing higher temperature, 800° C., the amount of butane cracked per pass is appreciably increased, being more than 90.0 per cent, the total unsaturates are high and although the methane content of the gas made is appreciable the hydrogen content is not high and little if any carbon forms provided the catalyst employed is not iron, unless steam is also used, and provided the reacting fluid does not contact iron at said temperature. Vanadium chrome steel does not catalyze carbon formation like iron or ordinary steel. The ethylene-propylene ratio is higher at this temperature; it is higher at 0.4 second time of contact than at 0.2 second at the same temperature. At 850° C. maximum temperature of the catalyst mass using steam in admixture with the vapor to be cracked, the results are as follows:

Time of contact—0.2 to 0.4 second.
Mole ratio steam to vapor—4.0 to about 5.0.
Pressure—substantially atmospheric.
Liquid or readily liquifiable products formed, charging petroleum naphtha is 50 weight per cent of the naphtha charged. The yield of $C_4H_x$ hydrocarbons is about 8.0 to 10.0 percent of the naphtha charged.

When less superheated steam is used, about 0.5 to 2.0 moles per mole of the hydrocarbon vapor, and a small amount of air used with the mixed steam-hydrocarbon vapor, enough to substantially maintain a maximum temperature in the catalyst mass of approximately 850° C. the results are somewhat different and very little if any carbon is formed. The total gas production is slightly increased, the readily liquifiable products are not materially changed and although the amount of propylene and ethylene is large somewhat more $C_4H_x$ is produced in the finished liquid products, and more CO and $CO_2$ are formed. In making unsaturated hydrocarbons largely from saturated hydrocarbons this is the preferred operation of my process. Less than 10.0 percent of the heat of combustion of the vapor reacted is consumed by combustion for maintaining the temperature of the catalyst; by preheating the naphtha and air used operation can be conducted with only 3.8 percent fuel consumption with substantially continuous operation. The latter result was obtained using slightly more than 2 moles of water vapor or superheated steam per mole of vaporized gasoline. The 3.8 percent fuel consumption is the heat units used for internal combustion as percent of the total heat of combustion of the hydrocarbon charged. The time of contact of reactants with the catalyst mass was 0.13 second.

One of the advantages of conducting this type of reaction, operating in the apparatus shown in Figure 1, is that the inner baffles 6 can readily be made of refractory non-metallic materials and when they are made as shown in Figure 2, they fit together forming a refractory duct within, through which hot fluids can pass without the damage which would occur if iron baffles were used. In other words unusually high temperatures can be used when desired in the apparatus shown in Figure 1.

At low rates of flow of straight butane vapor in the stream passing through the catalyst mass, rates approximating one second contact time, the unsaturates in the outgoing stream are as follows:

| | Degrees C. |
|---|---|
| 7.90 percent total unsaturates | 600 |
| 20.80 percent total unsaturates | 650 |
| 36.80 percent total unsaturates | 700 |
| 37.60 percent total unsaturates | 750 |
| 35.60 percent total unsaturates | 775 |
| 27.60 percent total unsaturates | 800 |
| 25.00 percent total unsaturates | 820 |

However, at constant temperature and increasing velocity of flow the following results were obtained, using copper as catalyst:

| Temperature | Time of contact of stream with catalyst | Total unsaturates in outgoing gas |
|---|---|---|
| ° C. | Seconds | Per cent |
| 750 | 1.0+ | 31.3 |
| 750 | 0.8 | 35.4 |
| 750 | 0.7 | 36.5 |
| 750 | 0.55 | 37.9 |
| 750 | 0.47 | 38.6 |
| 750 | 0.20 | 40.0 |

At somewhat lower temperature, at velocities so high that all of the butane charged is not cracked, and without using steam, there is formed 25 pounds of propylene per 100 pounds of butane per pass; recovering the uncracked butane and rerunning it the yield is more than 60 pounds of propylene per 100 pounds of butane. At 850° C. more than 94 percent of the butane is cracked yielding 31 pounds of propylene and 23 pounds of ethylene per 100 pounds of butane charged. Very little heat is consumed in this operation, and it develops that by keeping the superheated steam content in the range of 1 to 2 moles per mole of butane charged less than 3.8 percent combustion of butane or equivalent gas is required in order to make the operation self-sustaining as to temperature in the catalyst mass. However, the production of maximum butadiene and other $C_4$ unsaturated hydrocarbons is favored by the use of more steam, namely 2 to 4 moles per mole of hydrocarbon charged, high velocity of flow of reactant stream, approximating 0.1 to 0.2 second time of contact with the catalyst mass, and a small amount of air in the reactant fluid stream being approximately 3 to 5 percent of that required to completely burn the hydrocarbon used.

One specialized use for the process described above is the removal of carbon monoxide from hot hydrogen or other gas, in which it is usually not necessary to do more than pass the hot gas as a stream through a mass of iron catalyst, preferably not the oxide of iron, at a temperature of about 300° to 350° C. as described above for the production of carbon black, preferably under super-atmospheric pressure. Carbon and iron carbide form along with carbon dioxide as reaction products; the carbon and carbon dioxide pass out entrained in the gas whereas the carbide is removed with and as the catalyst.

Another special case, one in which triple valuable reactions products are made from one reactant, preferably diluted with an inert, is indicated by Equation 25

(25)  $2C_2H_4 = C_2H_2 + 3H_2 + 2C$ (favored by chromic oxide catalyst) which represents the result of thermal decomposition of ethylene gas in the presence of a catalyst followed by immediate cooling of the reaction products. Dilution of the reactant with nitrogen or other diluent is favorable to the reaction which is also favored by a reduction in the pressure at which the reaction is conducted. In this case, a particularly valuable carbon black is formed and the acetylene and hydrogen have known value and are readily separable from one another by known means. The heated ethylene is given the final temperature boost by the introduction of air, or oxygen enriched air, for the combustion of a portion of it, thus the ethylene stream entering the contact mass 4 of Figure 1 from 20 and 19—A is diluted and mixed with air from 17—A and preferably also with inert gas from 50. The reaction is endothermic thus the gas stream leaves the mass 4 at a lower temperature than obtains within said mass; the sudden cooling of the reaction products by contact with surface 9 is an aid in preventing further decomposition and preserving the acetylene formed. The preferred temperature for initiating the reaction indicated by Equation 25 is above 700° C. The amount of oxidant added through 17—A is approximately 4 to 10 percent of that required for complete combustion of the ethylene, the exact amount varying with the concentration of the ethylene in the mixture, the temperature of the diluent gases from 50 used in the mixture, and the temperature of the gas stream introduced through 19—A. The purpose of introducing the oxidant is to bring the ethylene to the temperature favorable for cracking into the reaction products mentioned, in the presence of the catalyst 4.

Before defining my claims, attention is called to a few factors relating to the apparatus shown in Figure 1, which I consider important, novel features, namely:

(1) The path of travel of fluid reactants through contact mass 4 is radial, therefore, the lineal velocity of a given volume of said fluid is decreasing throughout its travel through said mass. With exothermic reactions or combustion supported reactions the hot zone is nearer the inner baffles and the cooler zone near the outer baffles, hence the fluid stream travels at a higher rate of flow through the hotter zone.

(2) The rate of downward travel of the catalyst, by virtue of rotation of table 16, is not necessarily uniform over the whole thickness of the catalyst bed between the inner and outer baffles 6 and 7; by providing a steeper downward flare to the inner baffles, as shown, and by providing a rather long baffle 12 as shown, but without baffle 12—A, the travel of catalyst adjacent the inner baffles 6 is greater than that adjacent outer baffles 7. This condition is readily reversed by placing baffle 12 in the opposite position, namely, support it so as to flare downwardly and outwardly from fluid tube 20, as shown by 12—A, and by providing steeper sloping outer baffles 7 and wider flaring baffles 6. Thus, it is possible to cause the inner or outer portion of the catalyst in the reaction zone to travel at the greater lineal velocity downwardly. Obviously, proper adjustments can readily be made to provide substantially uniform downward movement of the catalyst through the reaction zone.

(3) In conducting high temperature reactions, the reaction chamber may be considered as confined within a boiler which boiler is itself a means of economizing heat; the boiler may be considered to be a surface combustion boiler.

(4) The inner series of baffles 7 with adjoining sections having ports 8 can readily be made of refractory material capable of withstanding high temperatures hence endothermic reactions such as the steam reforming of hydrocarbons forming CO and $H_2$ accompanied by combustion reactions, wherein initial temperatures of 950° C. are provided, can be conducted without damage to the equipment shown in Figure 1.

(5) The reaction zone is broadly a zone wherein fluids are treated and caused to react chemically, by virtue of contact with a bed of confined solids, and in which solids also may react by virtue of contact with a flowing stream. The time of contact of a stream passing through the catalyst mass confined between the two series of baffles 6 and 7 may be great or very short according to rate of supply of the stream containing reactant fluid, but the low limit is greater than that which is accompanied by appreciable entrainment of catalyst in the stream passing away from the catalyst mass. This limit is a function of the density of the catalyst and particle size. At very low lineal stream velocities the apparatus becomes a filtering medium and is usable for treating and clarifying fluids; here the advantages of decreasing lineal stream velocity through the contact mass is advantageous.

(6) Outer jacket 11, of Figure 1, is shown as confining a liquid but it can equally well be a means of superheating a vapor, when conditions warrant.

(7) When the solids in the reaction zone are wetted with a wetting agent, the apparatus of Figure 1 will function as a dust removal medium, it being necessary merely to so proportion the chamber that the lineal velocity of the dust-laden fluid introduced into 4 from duct 20 through 8 is sufficiently low. Fog can also be removed from gases in this manner; likewise moisture can be absorbed from a gas stream by selection of proper solid absorbent.

(8) With a given rate of flow of an aeriform stream through the annular column of solids confined between baffles 6 and 7 of Figure 1, which column has, for example, a mean inside diameter of 1 foot and a thickness of 1 foot, an increase of 50 percent in thickness, that is, an increase from 12 inches to 18 inches, will about double the time of contact of said stream with the solids, whereas the lineal velocity of the stream as it leaves the catalyst mass is reduced by about 33 percent, no corrections made for temperature-volume change.

(9) Process steam is generated, in conducting high-temperature reactions, at a rate proportional to the amount of such reaction promoted, when the jacket 11 is the steam generating unit of a steam boiler.

(10) This invention is believed to be particularly adapted to promote substantially complete dissociation of certain materials which do not require appreciable amounts of, if any, heat. Without unduly extending the description, reference is here made to a few reactions which are favored, by Equations 26 and 27.

(26) $\quad CH_4 = C + 2H_2$
(27) $\quad C_2H_4 = 2C + 2H_2$

In each of these equations the reactions will proceed continuously as a heated stream of either $CH_4$ or $C_2H_4$ is passed, in the manner described above, through a mass of contact solids as shown at 4 of Figure 1, after said solids have once been heated to an elevated temperature, preferably above 700° C., said solids preferably being catalytic to the reactions and which may comprise coke, carbon, iron, metal oxide or refractory material.

(11) In promoting strongly exothermic reactions benefits are derived from connecting a plurality of reactors in series, controlling the supply of reactants to avoid excessive temperatures in the catalyst mass, thus a portion only of the reaction sought is conducted in each reactor of the series.

I have found that by raising or lowering table 16 of Figure 1 the rate of discharge of solids is controlled as well as by rotation, hence I do not confine my invention to a particular means of removing the catalyst.

The present application is a division of my application Serial No. 467,108, filed November 27, 1942.

Having described my invention so that one skilled in the art can practice it, I claim:

1. The process of treating materials and promoting chemical reactions in a closed reaction chamber by contacting a reactant fluid with a loosely packed, confined mass of small-size solids, comprising, passing a stream of aeriform fluid initially comprising air, steam and a hydrocarbon, at a temperature below about 900° C. but above 100° C. from within a confined, upright, substantially annular, loosely packed column of said solids, substantially radially outwardly therethrough in intimate contact with said solids, thereby causing chemical reactions to occur among the said reactants while passing through said column with the formation of valuable reaction products, immediately cooling the stream containing the reaction products by contacting it with a cooled solid surface, removing it therefrom and recovering the said stream containing reaction products separate from said solids; the amount of air used being insufficient for the complete combustion of said hydrocarbon, and throughout the process passing the solid particles of said mass continuously downwardly with a free-flowing tumbling motion over a zigzag course at a rate sufficient to keep the bed pervious to the passage of the aeriform fluid therethrough and favorable for the production of said valuable reaction products.

2. The process of treating materials and promoting chemical reactions at an elevated temperature partly by contacting a reactive fluid with hot solid contact material, comprising, first causing a mass of small-size solids adapted to withstand being heated, confined in a reaction chamber, to be so disposed in a loosely packed, porous bed in the form of an upright annular column that said column has a plurality of substantially circular, spaced, declivous, free inner surfaces and a plurality of substantially circular spaced, declivous, free outer-wall surfaces, then passing a fluid stream, containing a hydrocrabon in the vapor phase and an oxidizing gas, initially at a temperature above 100° C. into said bed from within through said inner-wall surfaces, promoting chemical reactions in said bed at a temperature of the order of 600° C. to 900° C. forming at least one valuable reaction product, immediately discharging the stream containing said reaction product from said bed from said outer-wall surfaces and recovering said product, meanwhile maintaining the required high temperature in said bed at least partly by controlling the supply of said oxidizing gas, and throughout the process passing the solid particles of said mass continuously downwardly with a free-flowing tumbling motion over a zigzag course at a rate sufficient to keep the bed pervious to the passage of the aeriform fluid therethrough and favorable for the production of said valuable reaction products.

3. The process of treating materials and promoting chemical reactions in a closed reaction chamber by contacting a reactant fluid with a loosely packed, confined mass of small-size solids, comprising, passing a stream of aeriform fluid initially comprising a hydrocarbon and at least one member of a group consisting of steam and an oxidizing gas in insufficient quantity to complete combustion of the hydrocarbon, at a temperature below about 900° C. but above 100° C. from within a confined, upright, substantially annular, loosely packed column of said solids, substantially radially outwardly therethrough in intimate contact with said solids, thereby causing chemical reactions to occur in said stream while passing through said column with the formation of valuable reaction products, immediately cooling the stream containing the reaction products by contacting it with a cooled solid surface, removing it therefrom and recovering the said stream containing reaction products separate from said solids, and throughout the process passing the solid particles of said mass continuously downwardly with a free-flowing tumbling motion over a zigzag course at a rate sufficient to keep the bed pervious to the passage of the aeriform fluid therethrough and favorable for the production of said valuable reaction products.

4. The process of treating materials and promoting chemical reactions in a closed reaction chamber by contacting a reactant fluid with a loosely packed confined mass of small-size solids, comprising, passing a stream of aeriform fluid initially comprising an oxidizing gas and a hydrocarbon, at a temperature below about 900° C. but above 100° C. from within a confined, upright, substantially annular, loosely packed column of said solids, substantially radially outwardly therethrough in intimate contact with said solids, thereby causing chemical reactions to occur in said stream of aeriform fluid while passing through said column with the formation of valuable reaction products, immediately cooling the stream containing the reaction products by contacting it with a cooled solid surface, removing it therefrom and recovering the said stream containing reaction products separate from said solids; the amount of oxidizing gas being insufficient for the complete combustion of said hydrocarbon, and throughout the process passing the solid particles of said mass continuously downwardly with a free-flowing tumbling motion over a zigzag course at a rate sufficient to keep the bed pervious to the passage of the aeriform fluid therethrough and favorable for the production of said valuable reaction products.

5. A process as set forth in claim 3 wherein the aeriform stream of reactant fluid comprises a hydrocarbon and superheated steam.

6. A process as set forth in claim 3 wherein the aeriform stream comprises superheated steam and a heated hydrocarbon in the vapor phase.

7. A process as set forth in claim 3 wherein the solids constitute catalytic material for promoting the chemical reactions in the reactant fluid stream.

8. A process as set forth in claim 3 wherein the reactant fluid contains petroleum fractions which are treated at high temperatures for a short period of time to produce a reaction product containing unsaturated compounds.

9. A process as set forth in claim 3 wherein petroleum fractions in the reactant stream are cracked by exposure to the heated contact solids for a period of from 0.1 to 4 seconds.

10. A process as set forth in claim 3 wherein cracking temperatures of above 700° C. are employed for the production of aromatic compounds from petroleum fractions in the reactant stream.

11. A process as set forth in claim 3 wherein the reactant stream contains hydrocarbon vapors which are cracked by contact with said solids to produce a reaction product containing butadiene, the temperature during the cracking reaction being from about 750° C. to 850° C. and the time of exposure of the vapors to the solids being very short.

12. A process as set forth in claim 3 wherein the aeriform stream is in contact with the solids for a period of 0.1 to 4 seconds and at a temperature within the range of 600° C. to 900° C.

JOHN J. ALLINSON.

REFERENCES CITED

The following references are of record in the file of this patent:

UNITED STATES PATENTS

| Number | Name | Date |
|---|---|---|
| 1,732,381 | Schmidt et al. | Oct. 22, 1929 |
| 1,995,292 | Clark | Mar. 26, 1935 |
| 1,995,293 | Clark | Mar. 26, 1935 |
| 1,972,937 | Jaeger | Sept. 11, 1934 |
| 1,560,297 | Meigs | Nov. 3, 1925 |
| 1,963,258 | Brode | June 19, 1934 |
| 1,984,380 | Odell | Dec. 18, 1934 |
| 2,340,814 | Li Dov | Feb. 1, 1944 |
| 2,078,951 | Houdry | May 4, 1937 |
| 2,187,741 | Houdry | Jan. 30, 1940 |
| 2,265,837 | Harding | Dec. 9, 1941 |
| 2,303,717 | Arveson | Dec. 1, 1942 |
| 2,338,573 | Creelman | Jan. 4, 1944 |
| 2,362,621 | Fahnestock | Nov. 14, 1944 |
| 2,364,453 | Layng et al. | Dec. 5, 1944 |
| 2,376,365 | Lassiat | May 22, 1945 |

FOREIGN PATENTS

| Number | Country | Date |
|---|---|---|
| 543,747 | France | Sept. 8, 1922 |
| 533,037 | Germany | Sept. 8, 1931 |